Feb. 11, 1969    G. C. TOINET    3,426,999
DIAPHRAGM VALVES
Original Filed July 26, 1965    Sheet 1 of 4

INVENTOR
GEORGES CLAUDE TOINET
BY
Young + Thompson
ATTORNEYS

United States Patent Office 3,426,999
Patented Feb. 11, 1969

3,426,999
DIAPHRAGM VALVES
Georges Claude Toinet, 64 Rue Louis, Lyons, France
Continuation of application Ser. No. 474,689, July 26, 1965. This application Oct. 5, 1967, Ser. No. 673,221
Claims priority, application France, July 29, 1964, 45,020
U.S. Cl. 251—331                                       1 Claim
Int. Cl. F16k 7/16, 15/14, 31/50

ABSTRACT OF THE DISCLOSURE

A diaphragm valve has a body and a cap that define cooperating flanges for grasping a diaphragm between them that may be urged toward or away from a seat to close or open the valve, respectively. Those flanges have opposed parallel surfaces that are annular and coaxial and that are figures of revolution about their common axis and are inclined radially inwardly toward the valve seat. The flanges also have flat opposed surfaces disposed radially outwardly beyond the annular surfaces, so that the body and cap and diaphragm automatically correctly align with each other when the valve is assembled.

---

A diaphragm valve or cock is generally constituted by a rigid body inside which two half chanels meet and form a ridge which may be rectilinear, annular or of any other shape. A diaphragm of yielding material, reinforced or otherwise, of any suitable shape and thickness may engage said ridge, which may be considered hereinafter as forming the seat of the diaphragm or lying at a distance from said ridge, according to whether the two half channels are to communicate or otherwise, that is according to whether the fluid is to be allowed to pass or not through the valve which is to control its throughput.

A cap carrying an arrangement for positioning the diaphragm with reference to its seat is secured to the valve body by means always including two flat flanges between which the diaphragm is clamped securely along its periphery, so as to ensure the fluidtightness of the system including the body and diaphragm with reference to the outer atmosphere.

In the accompanying drawings given by way of example:

FIG. 1 illustrates the oldest of said prior valves.

FIGS. 2 and 3 are cross-sections each of one half of two improved valves of a prior type.

Figure 1:
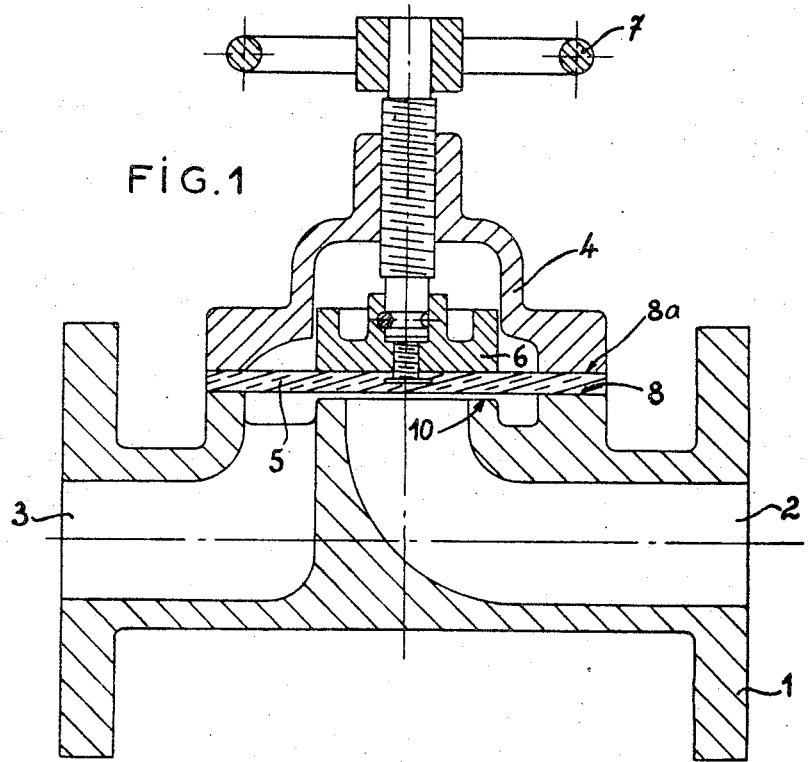
FIGS. 1, 2 and 3 illustrate valves executed in accordance with prior techniques, as disclosed hereinabove.
Figures 2, 3:
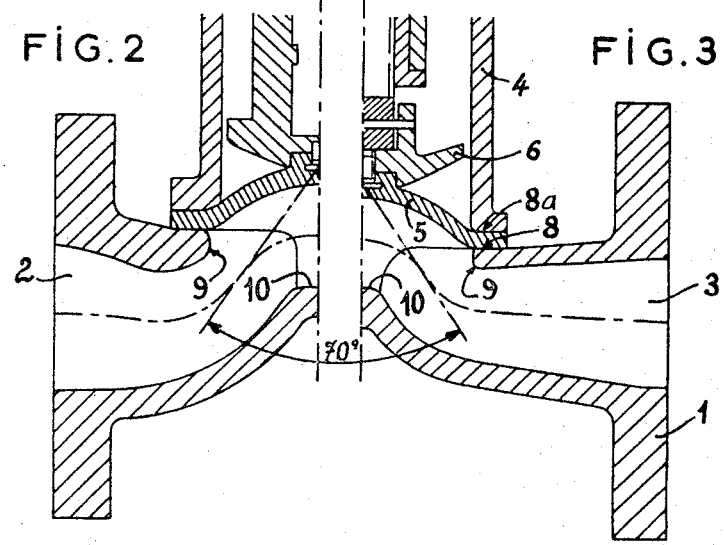

In FIGS. 1 to 3, 1 designates the valve body with its input and output half channels designated respectively by 2 and 3, while 4 designates the cap, 5 the diaphragm controlled by the positioning member 6 controlled in its turn by the handwheel 7; 8 and 8a designate the flanges formed respectively on the body 1 and on the cap 4, between which flanges the diaphragm is clamped, the seat of said diaphragm being illustrated at 10.

FIG. 1 illustrates the oldest type of prior diaphragm valves wherein the properties of a flat yielding diaphragm controlled fluidtightly from the outside are resorted to, without any notice being taken of the losses of head produced by the sudden changes in direction, cross-section, or shape of the cooperating channels.

FIGS. 2 and 3 show two improved prior types more generally used and which lead to a lesser loss of head by reason of the better shape given to the body and diaphragm which assumes a vaulted outline so that the sudden change in direction of the liquid stream obtained in the case of FIG. 1 is replaced by a mere inflexion given to the said stream.

In the valves illustrated in FIGS. 2 and 3, the position of the diaphragm 5 with reference to its seat 10 is defined by the gap separating the flange 8 on the body 1 from the flange 8a on the cap 4, and By the thickness given to the flange 8 so as to resist the inner pressure arising inside the valve body, And by the possibilities of resisting the flexional stresses produced by the deformation of the yielding material forming the diaphragm 5, when it passes between its extreme closed and open positions.

These different arrangements and the technical requirements lead to the necessity of forming in the areas securing the diaphragm 5 in the half channels 2 and 3, thick beads 9 located underneath the diaphragm; such beads disturb the flow of the fluid stream, first by reason of the disturbance of the fluid flow on the upstream side and then through compression of the fluid flowing downstream. Furthermore, the thickness of said beads produces a large deflection of the fluid stream.

In order to prevent any substantial deformation of the diaphragm and to eliminate any considerable tensioning or compressing stresses in the diaphragm in its successive positions between the fully open and completely closed positions of the valve, it is necessary for the distance between the upper vaulted section of the diaphragm and the upper surface 8 of the flange on the body 1 or 2 to approximate the distance separating said surface of the flange from the seat of the diaphragm. This leads to setting the seat at a comparatively high location with reference to the longitudinal axis of the valve and consequently the two half channels 2 and 3 must be considerably incurved in the vicinity of their meeting point in registry with the seat. This incurved shape given to the half channels forms an actual hindrance for the elementary fluid streams and constrains the latter to negotiate changes in direction approximating 70° as illustrated clearly in FIGS. 2 and 3 and consequently the flow impinges to a large extent against the lower surface of the diaphragm. This leads to considerable losses of head.

My invention has for its object to eliminate

The upstream bead which leads to a disturbance of the fluid flow;

The downstream bead which produces a compression of the fluid;

The dam constituted by the diaphragm and forming an abutment for the fluid stream;

The very large changes in direction inside the valve body; and

The considerable reduction in the cross-sectional area provided for the passage of the stream in registry with the seat.

My invention consists therefore in a characteristic shape given to the flanges 8 and 8a of the body and cap between which flanges the diaphragm is clamped.

According to my invention, said shape includes at least a frusto-conical bearing surface, an annular spherical segment or the like surface having tangents to its generatrix inclined to the longitudinal valve axis.

Figure 4:
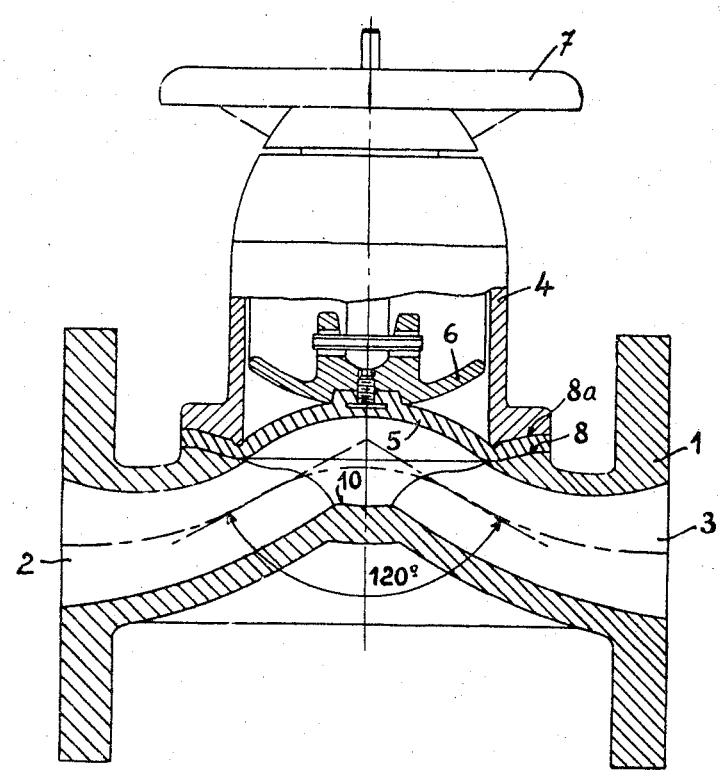
FIG. 4 is an axial cross-section passing through the medial longitudinal vertical plane of my improved valve or cock.
Figure 5:
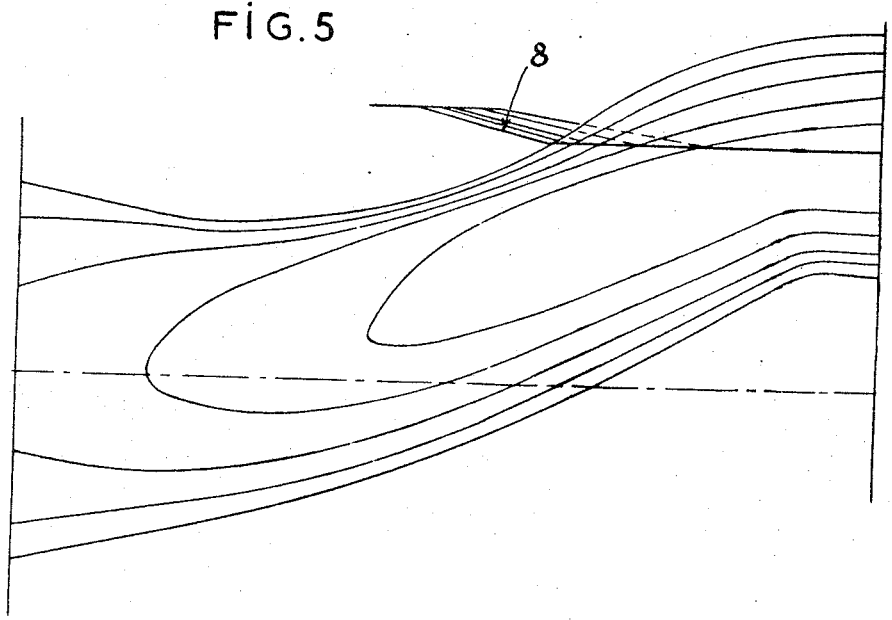
FIGS. 5 and 6 show different longitudinal half sections of said valve body through successive parallel vertical planes.
Figure 6:
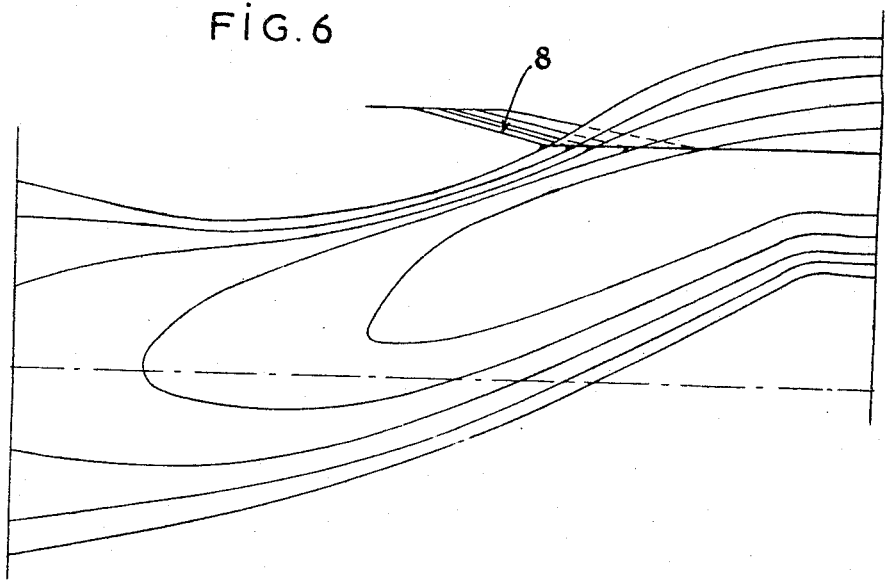

As illustrated in FIG. 4, the flange 8 is of a frusto-conical shape or in the shape of a spherical annulus, or else it may be given any suitable shape adapted to make the inner surfaces of the diaphragm 5 and of the channels 2 and 3 merge into one another along lines and surfaces which are tangent to each other, as illustrated in FIGS. 5 and 6. FIG. 5 illustrating a valve body in which the flange 8 has been machined, while FIG. 6 shows a modification according to which the flange 8 of the valve body is in its rough cast condition. It is apparent, in this latter case, that the connection may show a very slight gap between the parts by reason of the difficulties inherent to the casting technique, when it is desired to obtain sharp metal ridges.

If the valve body carries a coat protecting it against chemical or mechanical reagents or if the surface of the flange is machined, the merging between the two surfaces is perfect, as illustrated in FIG. 5. If the surface of the flange is left in its rough cast condition, a slight gap appears, as illustrated in FIG. 6.

The lower lines of said cross-section illustrated in FIGS. 5 and 6 are constituted by curves having a large radius and extending into straight lines forming together a very open angle of about 120°, as illustrated in FIG. 4.

FIGS. 5 and 6 are like contour maps of the interior of the valve. In FIG. 5, the horizontal line that cuts those curved contours represents the boundary between the valve body and the diaphragm. It will be noted that the curves cut that horizontal line at particular points and that the junction between the curve and the horizontal line is quite sharp. Thus, sharp edges are formed on the valve body, at least in the longitudinal midplane of the valve.

The almost parallel diagonal lines that extend upwardly to the left in FIGS. 5 and 6, and that terminate to the upper left in a further horizontal line, are also contour lines, but they are contour lines along the under surface of the diaphragm flange or the corresponding flange of the valve body. As these diagonal lines are straight, FIGS. 5 and 6 refer to the embodiment in which the annular surface of revolution is frustoconical. So in FIGS. 5 and 6, the almost parallel diagonal lines are elements of a conical surface that pass through the points where the edge of that conical surface meets the curved contour lines in FIGS. 5 and 6. In other words, moving along one of the curved contour lines until the diaphragm-valve body interface is reached, one would proceed from that point of intersection along the corresponding generatrix or element of the conical surface, in order to produce the parallel diagonal lines in FIGS. 5 and 6. The horizontal line in which these diagonal lines terminate upwardly, of course, is the edgewise view of the same lines in the flat plane which is the flange of the diaphragm. Therefore, FIGS. 5 and 6 combine with FIGS. 7 and 8, in order to demonstrate that the diaphragm has flat opposed surfaces radially outwardly beyond said annular surfaces.

On the other hand, the actual outlines of the flanges 8 and 8a allow obtaining throughout the length of the channel in which the valve is fitted, cross-sections the areas of which are equal to the areas defined by the nominal diameter. Said cross-sections are round in registry with the input and outlet flanges of the valve and become more and more oval and flat as they are considered nearer the diaphragm seat, so as to ensure a perfect merging between the successive inner surfaces. The actual diaphragm which is of a vaulted shape may be molded so as to show along its periphery the same outline as that of the flanges 8 and 8a of the valve body and cap or its periphery may be flat, or else it may approximate entirely or partly the final outline to be obtained when the diaphragm is clamped between the flanges of the body and cap.

My invention covers the frusto-conical, partly spherical or the like shapes given to the periphery of the diaphragm as also to the flanges and actual channel.

Figure 7:
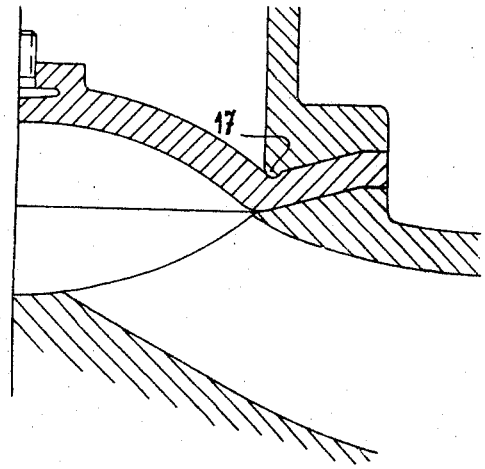
FIGS. 7 and 8 are larger scale illustrations of a preferred embodiment, the advantages of which are shown clearly by comparison with the detail view of FIG. 9.
Figure 8:
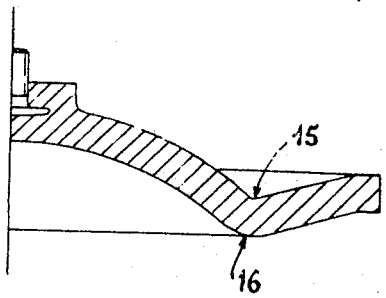
Figure 9:
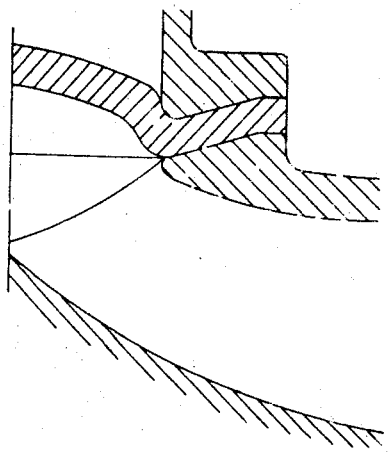

My invention also covers the particular embodiment illustrated in FIGS. 7 to 9 for the diaphragm 5 and cap 4.

In FIG. 8, the diaphragm is shown as molded and its radius at 15 is substantially equal to zero, while at 16 it approximates a value equal to the diaphragm thickness.

As to the cap 4 illustrated in FIG. 7, it includes an annular bead 17. Upon assembly of the body, diaphragm and cap, said bead engages the diaphragm and produces when the valve is in its open position, a stress within its thickness between 15 and 16, which stress is opposed to that which is obtained when the valve is closed. By reason of this reduction in the stress obtained when the valve is closed, a small radius at 16 may be sufficient.

The bead 17 has also for its purpose a firm engagement between the diaphragm and the upper ridge defining the channel in the body 1.

Under such conditions, the cock or valve being open, while a fluid under pressure passes through the valve body, the vaulted central part of the diaphragm which assumes the shape of a fraction of a sphere with a radius reduced to zero in registry with the flange of the cap, cannot be deformed in the manner illustrated in FIG. 9 and it retains in fact its original shape illustrated in FIG. 7.

My invention is obviously applicable to all cocks and valves incorporating a diaphragm made of any material such as metal, plastic material, or the like, provided possibly with protecting coats or subjected to a surface treatment or otherwise.

Lastly, it is obvious as apparent from the preceding disclosure that my invention is by no means limited to the sole embodiments described hereinabove by way of exemplification and it covers all the modifications thereof falling within the scope of the accompanying claims.

What is claimed is:

1. In a diaphragm valve comprising a body having an inlet opening and an outlet opening and a valve seat between the inlet and outlet openings, a cap and cooperating flanges by which the cap is detachably secured to the body, a diaphragm peripherally secured between the flanges, and a valve actuator for moving the diaphragm selectively away from the seat to open the valve and toward and into engagement with the seat to close the valve; the improvement comprising the flanges having complementary opposed surfaces between which the edges of the diaphragm are clamped, said surfaces being annular and coaxial and being defined by figures of revolution about their common axis, said axis being perpendicular to the direction of fluid flow through the inlet and outlet openings, said surfaces being inclined radially inwardly toward the valve seat so that the surfaces are inclined both to their common axis and to the direction of fluid flow through the inlet and outlet openings, said flanges having flat opposed surfaces perpendicular to said axis radially outwardly beyond said annular surfaces, the fluid passageway through the valve being circular adjacent the inlet and outlet openings and becoming progessively more oval adjacent said seat, the diaphragm being spherically concave in the open valve position, the valve body having interior surfaces that are convexly curved along the longitudinal midplane of the valve and that terminate along said midplane in sharp edges at the diaphragm, the convex curve of the valve body merging smoothly into the concave curve of the diaphragm in a substantially continuous surface along said midplane thereby to avoid any abrupt break in said continuous surface, the portions of said continuous surface on opposite sides of said seat forming a large obtuse angle with each other to reduce turbulence in the fluid flowing through the valve.

References Cited

UNITED STATES PATENTS

| | | |
|---|---|---|
| 2,054,340 | 9/1936 | Saunders. |
| 2,227,914 | 1/1941 | Saunders. |
| 2,537,308 | 1/1951 | Hanson. |
| 2,716,017 | 8/1955 | Linker. |
| 3,154,286 | 10/1964 | McFarland _____ 251—331 |
| 3,175,473 | 3/1965 | Boteler et al. _____ 251—331 X |
| 3,257,097 | 6/1966 | Boteler. |

FOREIGN PATENTS

| | | |
|---|---|---|
| 805,474 | 5/1951 | Germany. |
| 808,074 | 1/1959 | Great Britain. |

ARNOLD ROSENTHAL, *Primary Examiner.*